United States Patent
Tsai

(10) Patent No.: US 11,396,206 B2
(45) Date of Patent: Jul. 26, 2022

(54) BICYCLE WHEEL

(71) Applicant: SHENG I FIRST CO., LTD., Changhua County (TW)

(72) Inventor: Chin-Tsai Tsai, Changhua County (TW)

(73) Assignee: SHENG 1 FIRST CO., LTD., Changhua County (TW)

( * ) Notice: Subject to any disclaimer, the term of this patent is extended or adjusted under 35 U.S.C. 154(b) by 333 days.

(21) Appl. No.: 16/734,349

(22) Filed: Jan. 5, 2020

(65) Prior Publication Data
US 2021/0206200 A1    Jul. 8, 2021

(51) Int. Cl.
*B60B 21/06* (2006.01)
*B60B 1/04* (2006.01)

(52) U.S. Cl.
CPC ............. *B60B 21/062* (2013.01); *B60B 1/042* (2013.01); *B60B 1/048* (2013.01)

(58) Field of Classification Search
CPC .................. B60B 21/06; B60B 21/062; B60B 1/041–045; B60B 1/048
USPC ............................................................ 301/59
See application file for complete search history.

(56) References Cited

U.S. PATENT DOCUMENTS

| | | | | |
|---|---|---|---|---|
| 286,476 A * | 10/1883 | Notley | ............... | B60B 1/042 301/59 |
| 677,319 A * | 6/1901 | McConville | ............ | B60B 1/00 301/58 |
| 1,043,283 A * | 11/1912 | Zarth | ............... | B60B 21/064 301/56 |
| 1,433,435 A * | 10/1922 | Van Horn | ............... | B60B 1/06 301/74 |
| 1,474,183 A * | 11/1923 | Wagenhorst | ............ | B60B 1/042 301/74 |
| 5,487,592 A * | 1/1996 | Rasmussen | ........... | B60B 27/023 301/59 |
| 5,779,323 A * | 7/1998 | Burrows | ............... | B60B 1/0246 301/58 |
| 5,806,935 A * | 9/1998 | Shermeister | .......... | B60B 21/023 301/58 |
| 5,810,453 A * | 9/1998 | O'Brien | ............... | B60B 21/025 301/59 |

(Continued)

FOREIGN PATENT DOCUMENTS

TW    M442280 U1    12/2012

*Primary Examiner* — Jason R Bellinger
(74) *Attorney, Agent, or Firm* — Chun-Ming Shih; Lanway IPR Services

(57) ABSTRACT

A bicycle wheel contains a rim, multiple spokes, and multiple abutting faces. The rim includes multiple through orifices, a hub, and multiple threaded orifices. Two intersected spokes are connected with two adjacent through orifices and two threaded orifices corresponding to the two adjacent through orifices respectively. Each spokes includes a first screwing section and a second screwing section. The second screwing section is screwed with each of multiple nuts and each of multiple second screw bushings. The multiple abutting faces are connected with the multiple spokes respectively. Each spoke includes an axial line defined along a center thereof. An angle is defined between each abutting face of the rim and the axial line of each spoke and is 90 degrees. Two connection sections are formed on two ends of each abutting face.

1 Claim, 8 Drawing Sheets

(56) References Cited

U.S. PATENT DOCUMENTS

| | | | | |
|---|---|---|---|---|
| 6,024,413 | A * | 2/2000 | Dixon | B60B 21/062 301/58 |
| 6,378,953 | B2 * | 4/2002 | Mercat | B60B 1/041 301/58 |
| 7,374,251 | B2 * | 5/2008 | Okajima | B60B 1/042 301/58 |
| 8,162,407 | B2 * | 4/2012 | Mercat | B60B 1/041 301/58 |
| 8,979,214 | B2 * | 3/2015 | Tho | B60B 21/062 301/58 |
| 2002/0149257 | A1 * | 10/2002 | Miansian | B60B 1/0261 301/74 |
| 2020/0114683 | A1 * | 4/2020 | Chen | B60B 1/041 |
| 2021/0086553 | A1 * | 3/2021 | Tsai | B60B 1/003 |

\* cited by examiner 4-4

BICYCLE WHEEL

FIELD OF THE INVENTION

The present invention relates to a bicycle wheel in which the rim is connected with the hub securely and does not deform by using each spoke.

BACKGROUND OF THE INVENTION

A conventional bicycle wheel contains a rim, a hub, and multiple spokes configured to form a spoke fixed between the rim and the hub. The rim includes multiple through orifices defined on an inner wall of the rim, multiple first ends of the multiple spokes are connected with the hub, and multiple second ends of the multiple spokes are connected with the multiple spokes through the multiple through orifices by ways of multiple connecting elements respectively. However, the multiple spokes are extrusion formed from aluminum, an arcuate surface are formed between multiple nuts and the inner wall of the rim when the multiple spokes are screwed with the multiple nuts by ways of the multiple connection elements respectively, hence the multiple connection elements and the multiple nuts do not contact with the inner wall of the rim matingly.

A bicycle wheel is disclosed in TW Publication No. M442280 and contains a rim, a hub, and multiple spokes configured to form a spoke. The rim includes multiple coupling elements, each of the multiple coupling elements has an internal segments fixed on an inner wall of the rim, and each coupling element has an external segment exposing outside the inner wall of the rim. Each spoke has a defining segment connected with the hub and has a locking notch defined opposite to the defining segment and connected with each coupling element. However, each coupling element is not screwed on the inner wall of the rim, thus the rim cannot be connected with each coupling element securely.

The present invention has arisen to mitigate and/or obviate the afore-described disadvantages.

SUMMARY OF THE INVENTION

The primary objective of the present invention is to provide a bicycle wheel which when each nut and each second screw bushing are screwed with the second screwing section of each spoke and connect with each spoke by ways of the axial line of each spoke, each abutting face of the rim and the hub, each nut and each second screw bushing matingly contact with each abutting face so that the rim is connected with the hub securely and does not deform by using each spoke.

To obtain the above mentioned objective, a bicycle wheel provided by the present invention contains: a rim, multiple spokes, and multiple abutting faces.

The rim includes multiple through orifices defined around an inner wall of the rim, a hub fixed on a center of the rim, and multiple threaded orifices arranged around two side surfaces of the hub and corresponding to the multiple through orifices respectively.

Two intersected spokes are connected with two adjacent through orifices and two threaded orifices which correspond to the two adjacent through orifices respectively. Each of the multiple spokes includes a first screwing section formed on a first end of each spoke, and each spoke further includes a second screwing section formed on a second end thereof, such that the first screwing section is inserted through each through orifice to screw with each threaded orifice of the hub and each of multiple first screw bushings, and the second screwing section is screwed with each of multiple nuts and each of multiple second screw bushings. Each nut is located on the inner wall of the rim, and each second screw bushing is located on an outer wall of the rim.

The multiple abutting faces are formed on the inner wall of the rim and connected with the multiple spokes respectively. Each spoke includes an axial line defined along a center thereof, an angle is defined between each abutting face of the rim and the axial line of each spoke and is 90 degrees, two connection sections are formed on two ends of each abutting face, such that each nut and each second screw bushing are screwed with the second screwing section of each spoke and the rim, and each nut and each second screw bushing matingly contact with each abutting face.

DETAILED DESCRIPTION OF THE PREFERRED EMBODIMENTS

Figure 1:
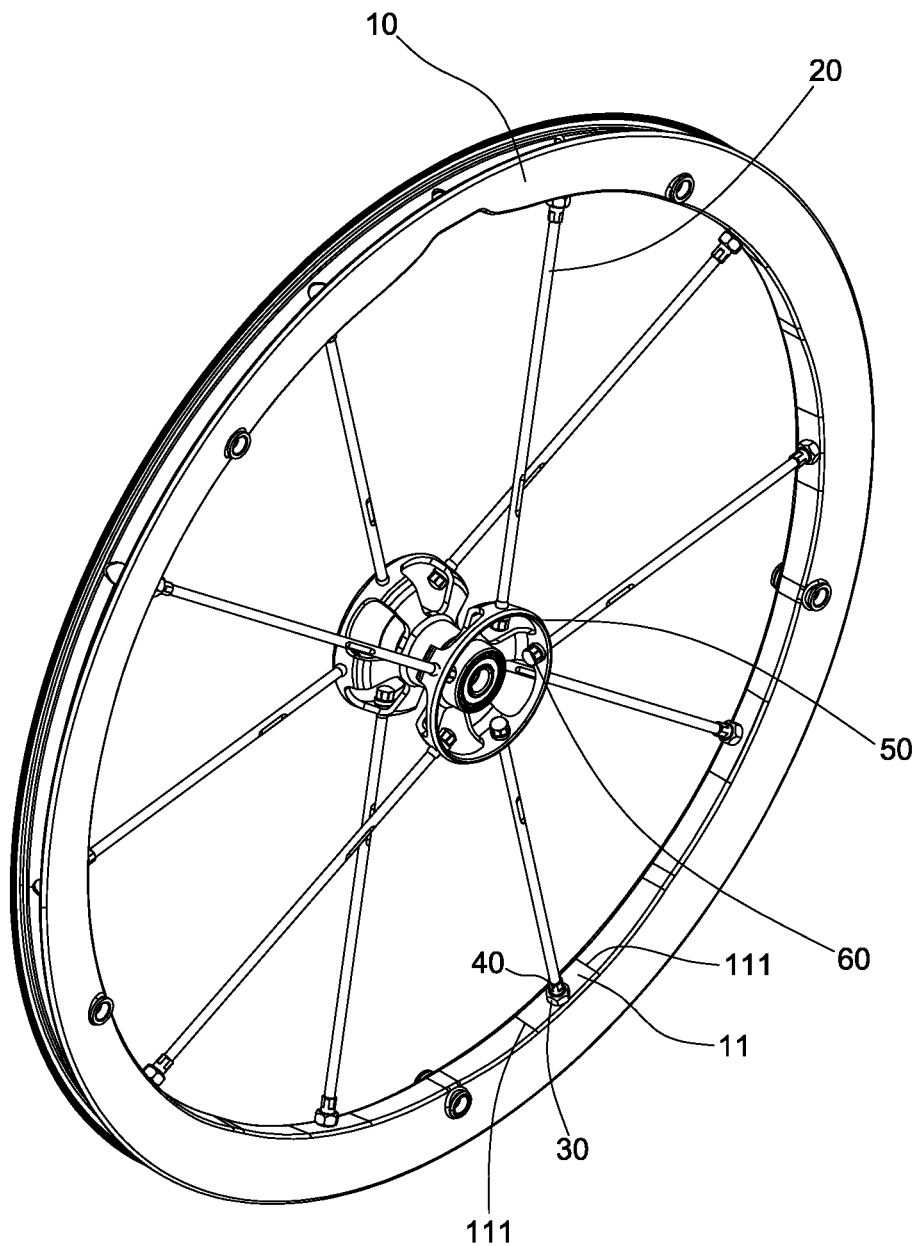
FIG. 1 is a perspective view showing the assembly of a bicycle wheel according to a preferred embodiment of the present invention.
Figure 2:
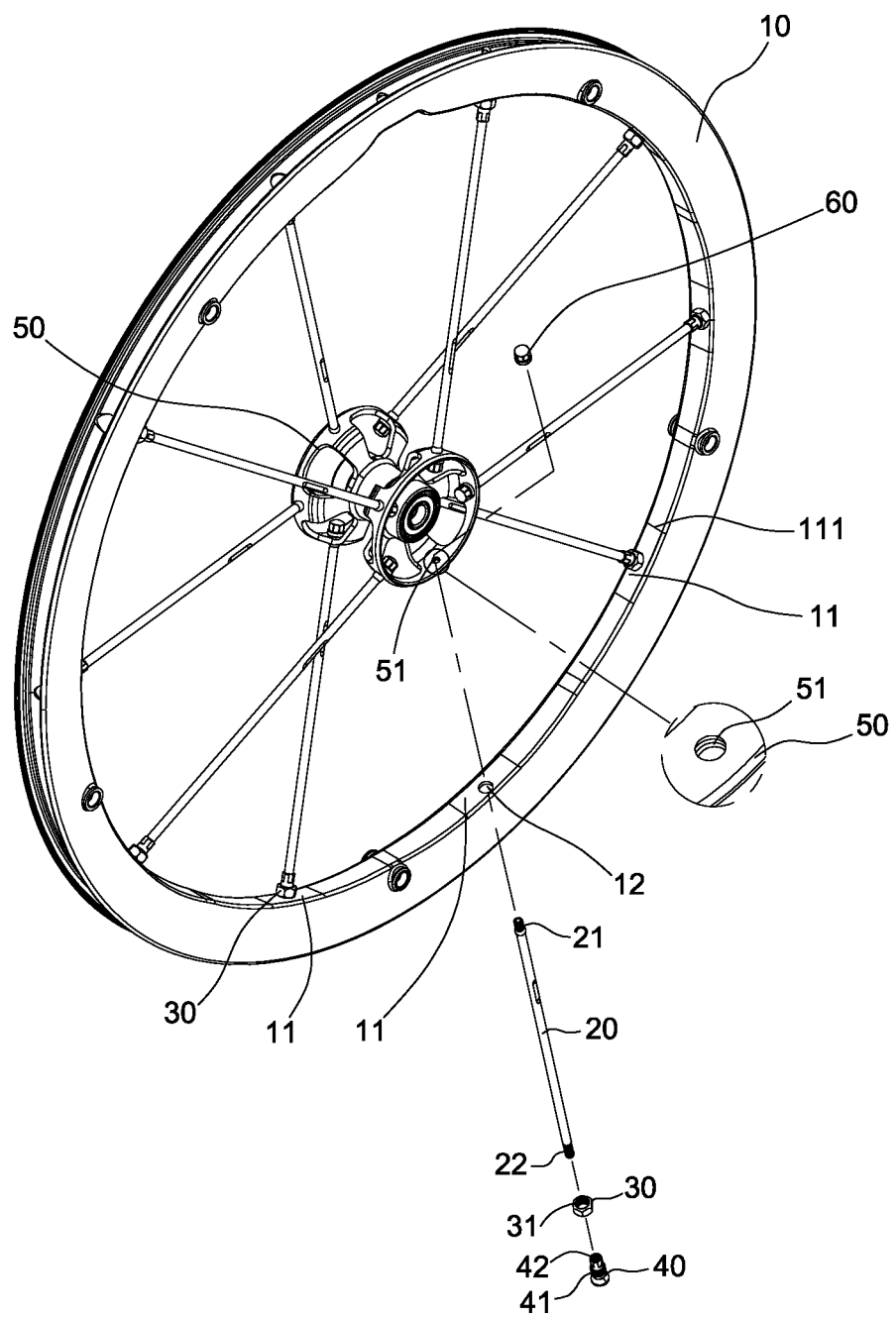
FIG. 2 is a perspective view showing the exploded components of the bicycle wheel according to the preferred embodiment of the present invention.
Figure 3:
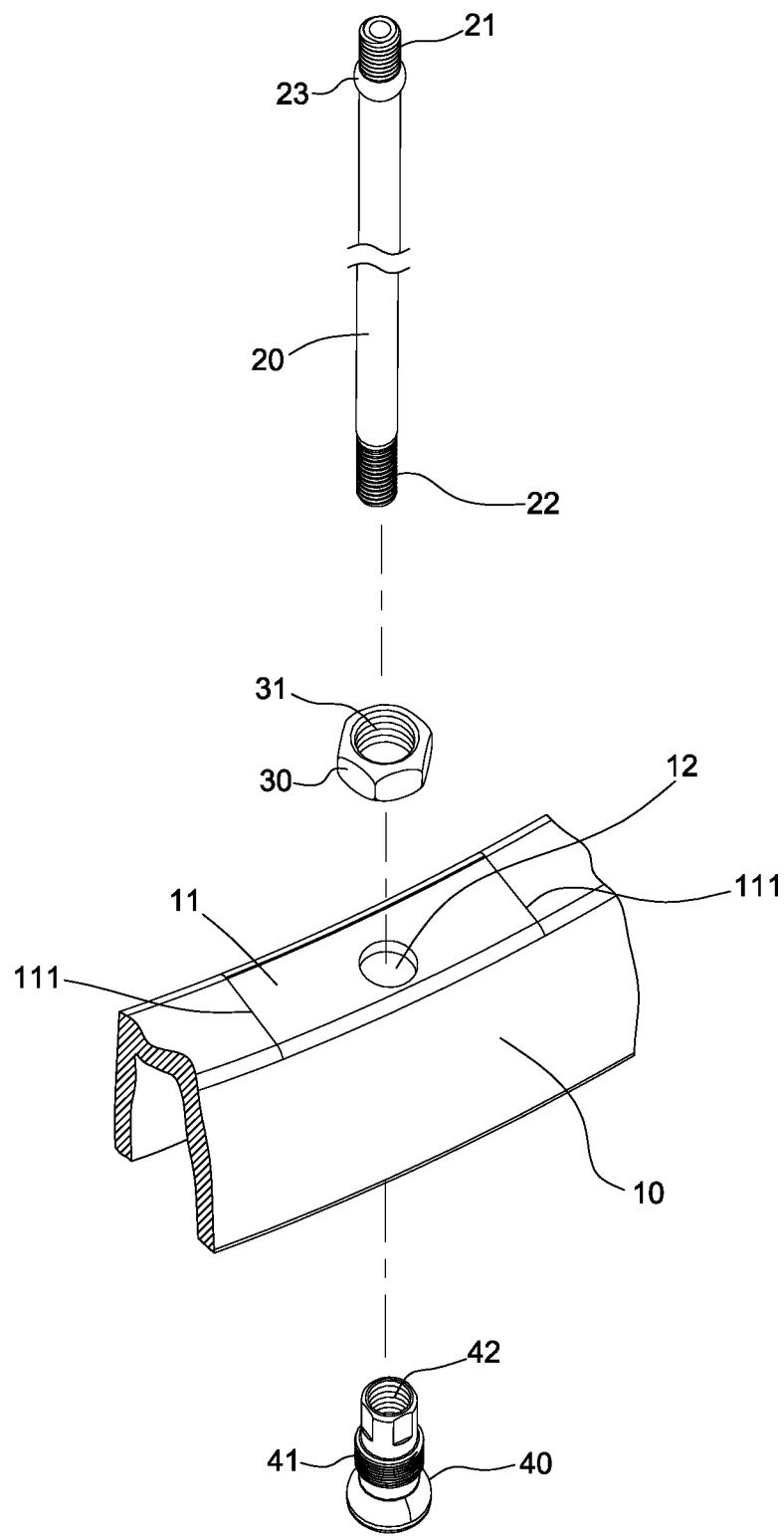
FIG. 3 is a perspective view showing the exploded components of a part of the bicycle wheel according to the preferred embodiment of the present invention.
Figure 4:
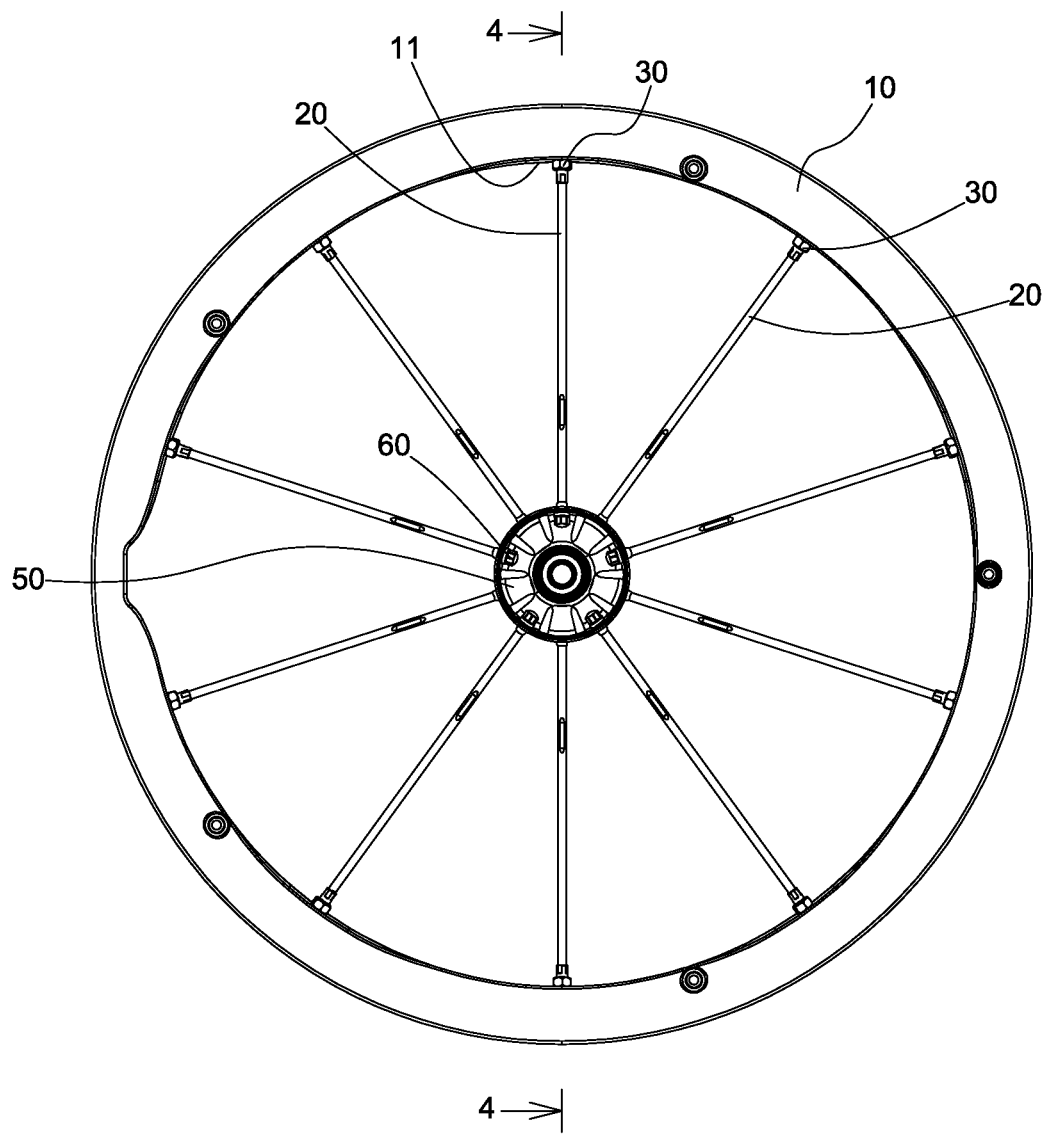
FIG. 4 is a side view showing the assembly of the bicycle wheel according to the preferred embodiment of the present invention.
Figure 5:
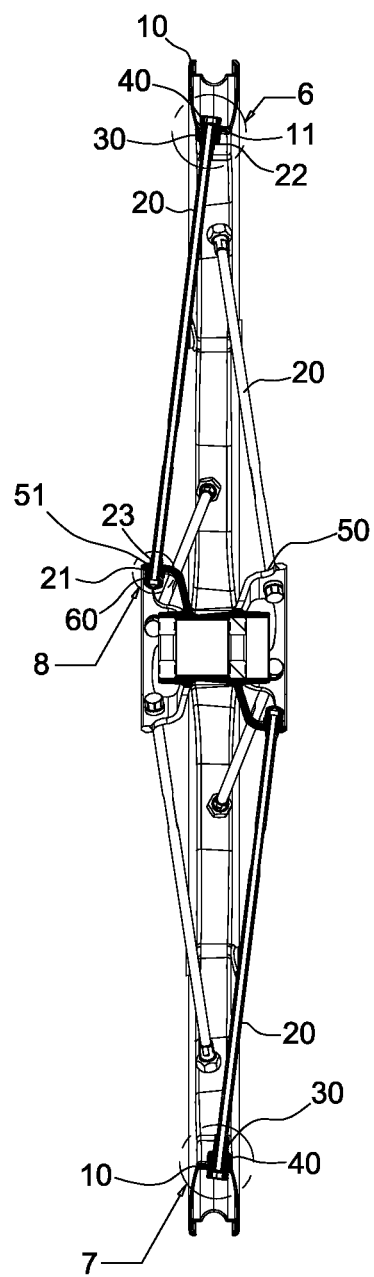
FIG. 5 is a cross sectional view taken along the line 4-4 of FIG. 4.
Figure 6:
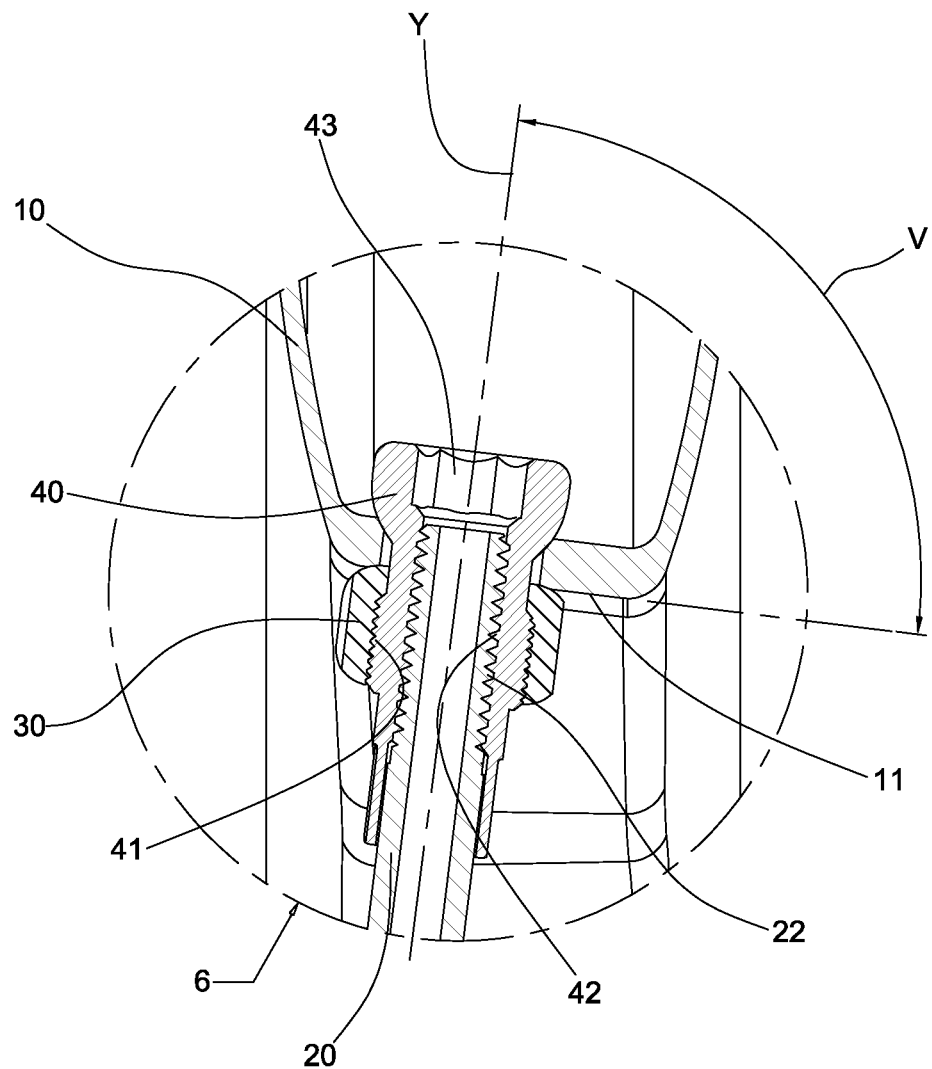
FIG. 6 is a cross sectional view of a part of FIG. 5.
Figure 7:
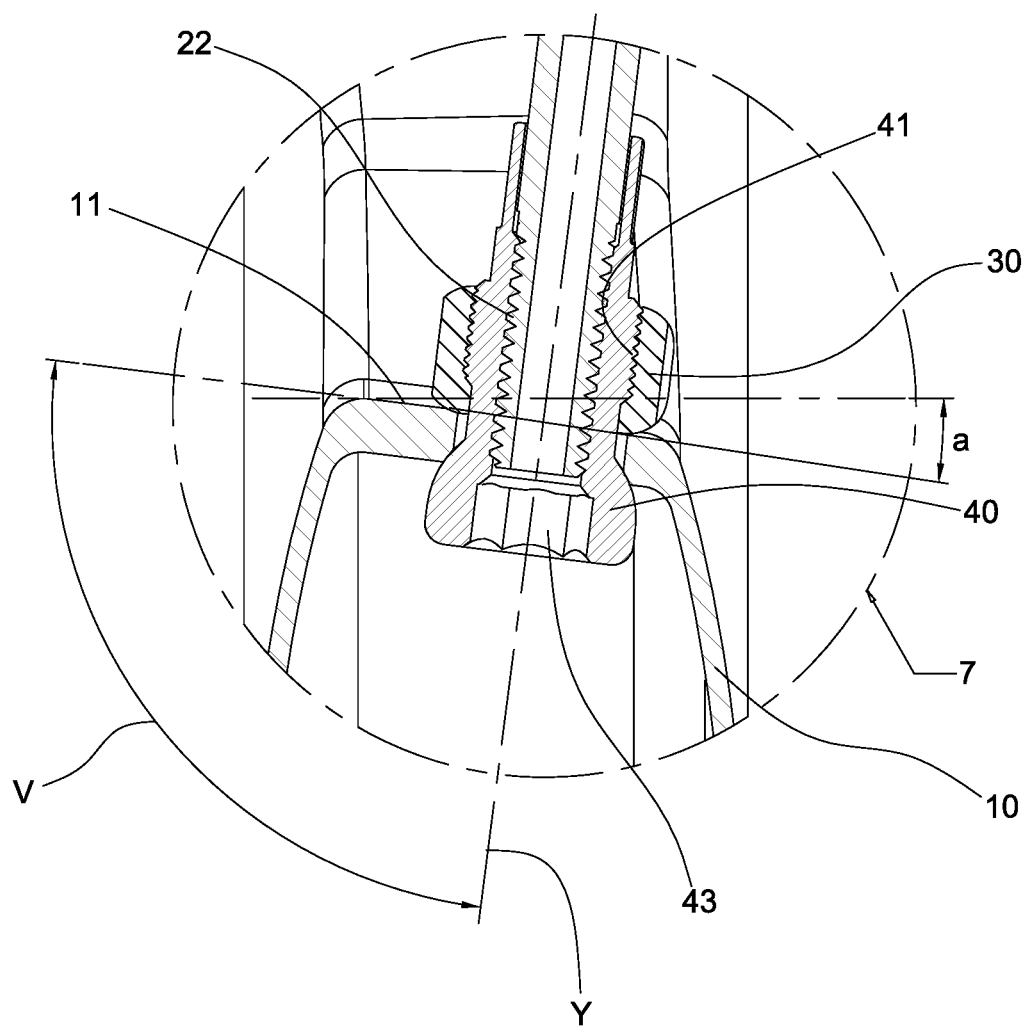
FIG. 7 is a cross sectional view of another part of FIG. 5.
Figure 8:
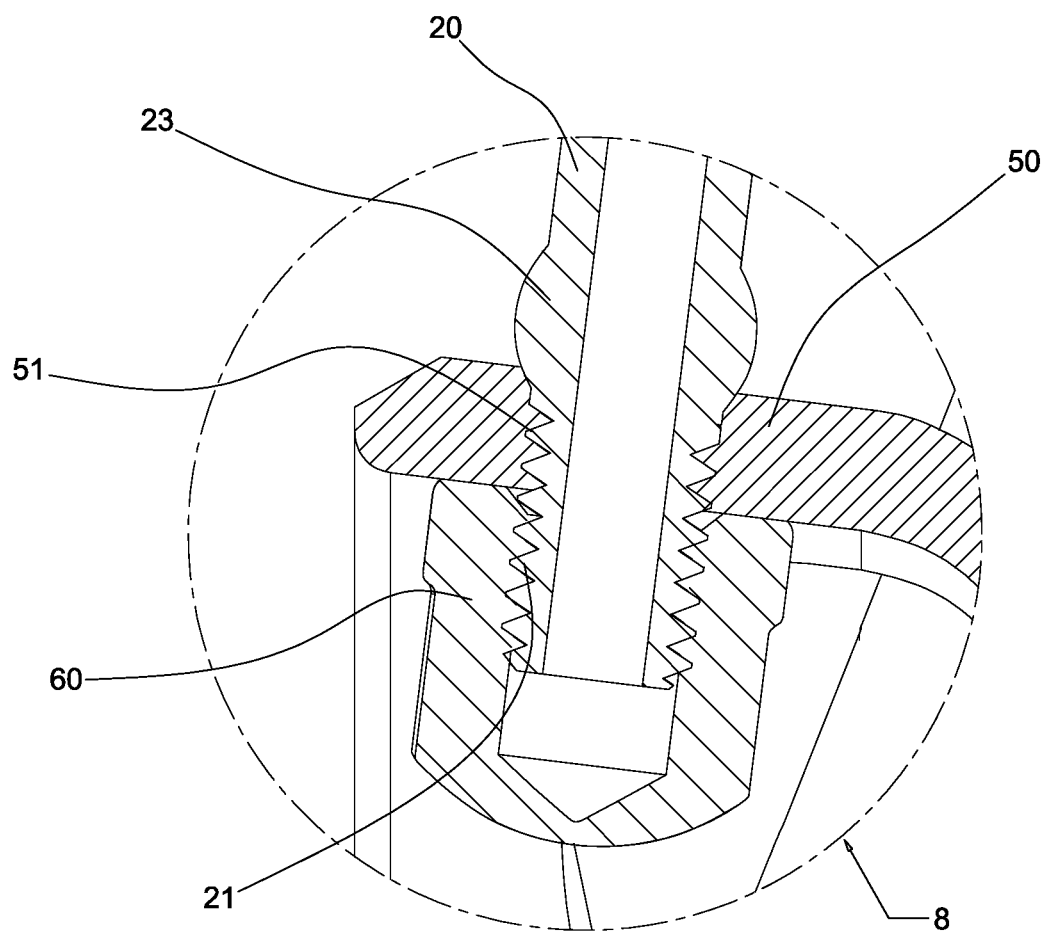
FIG. 8 is a cross sectional view of another part of FIG. 5.

With reference to FIGS. 1-8, a bicycle wheel according to a preferred embodiment of the present invention comprises: a rim 10 including multiple through orifices 12 defined around an inner wall of the rim 10, a hub 50 fixed on a center of the rim 10, multiple threaded orifices 51 arranged around two side surfaces of the hub 50 and corresponding to the multiple through orifices 12 respectively, and multiple spokes 20, wherein two intersected spokes 20 are connected with two adjacent through orifices 12 and two threaded orifices 51 which correspond to the two adjacent through orifices 12 respectively, each of the multiple spokes 20 includes a first screwing section 21 formed on a first end of each spoke 20, and each spoke 20 further includes a second screwing section 22 formed on a second end thereof, such that the first screwing section 21 is inserted through each through orifice 12 to screw with each threaded orifice 51 of the hub 50 and each of multiple first screw bushings 60, and the second screwing section 22 is screwed with each of multiple nuts 30 and each of multiple second screw bushings 40, wherein each nut 30 is located on the inner wall of the rim 10, and each second screw bushing 40 is located on an outer wall of the rim 10; and multiple abutting faces 11 formed on the inner wall of the rim 10 and connected with the multiple spokes 20 respectively, wherein each spoke 20 includes an axial line Y defined along a center thereof, an angle V is defined between each abutting face 11 of the rim 10 and the axial line Y of each spoke 20 and is 90 degrees, two connection sections 111 are formed on two ends of each abutting face 11, such that each nut 30 and each second screw bushing 40 are screwed with the second screwing section 22 of each spoke 20 and the rim 10, and each nut 30 and each second screw bushing 40 matingly contact with each abutting face 11.

Each nut 30 has a first inner threaded portion 31, and each second screw bushing 40 has a second inner threaded portion 42 and an external screwing section 41, wherein a diameter of the first inner threaded portion 31 of each nut 30 is equal to that of the external screwing section 41 of each second screw bushing 40, and a diameter of the second inner threaded portion 42 of each second screw bushing 40 is equal to that of the second screwing section 22 of each spoke 20. Each second screw bushing 40 has a noncircular notch 43 defined on an end thereof opposite to the second inner threaded portion 42, and the noncircular notch 43 is configured to connect with a hand tool so as to rotate each second screw bushing 40 by using the hand tool. The second inner threaded portion 42 of each second screw bushing 40 is extended out of the inner wall of the rim 10 via each through orifice 12. Thereafter, the second screwing section 22 of each spoke 20 is screwed with the second inner threaded portion 42 of each second screw bushing 40, and the first inner threaded portion 31 of each nut 30 is screwed with the external screwing section 41 of each second screw bushing 40.

Each spoke 20 further includes a peripheral rib 23 extending adjacent to the first screwing section 21 and configured to fix the each threaded orifice 51 of the hub 50, and the first screwing section 21 of each spoke 20 is screwed with each first screw bushings 60. When each nut 30 and each second screw bushing 40 are screwed with the second screwing section 22 of each spoke 20 and connect with each spoke 20 by ways of the axial line Y of each spoke 20, each abutting face 11 of the rim 10 and the hub 50, each nut 30 and each second screw bushing 40 matingly contact with each abutting face 11 so that the rim 10 is connected with the hub 50 securely and does not deform by using each spoke 20.

What is claimed is:

1. A bicycle wheel comprising:
   a rim including multiple through orifices defined around an inner wall of the rim, a hub fixed at a center of the rim, multiple threaded orifices arranged around two side surfaces of the hub and corresponding to the multiple through orifices respectively;
   multiple spokes, wherein two intersected spokes are connected with two adjacent through orifices and two threaded orifices which correspond to the two adjacent through orifices respectively, wherein each of the multiple spokes includes a first screwing section formed on a first end of each spoke, and each spoke further includes a second screwing section formed on a second end thereof, such that the first screwing section is inserted through each through orifice to screw with each threaded orifice of the hub and each of multiple first screw bushings, and the second screwing section is screwed with each of multiple nuts and each of multiple second screw bushings, wherein each nut is located on the inner wall of the rim, and each second screw bushing is located on an outer wall of the rim; and
   multiple abutting faces formed on the inner wall of the rim and connected with the multiple spokes respectively, wherein each spoke includes an axial line defined along a center thereof, an angle is defined between each abutting face of the rim and the axial line of each spoke and is 90 degrees, two connection sections are formed on two ends of each abutting face, such that each nut and each second screw bushing are screwed with the second screwing section of each spoke and the rim, and each nut and each second screw bushing matingly contact with each abutting face;
   wherein each nut has a first inner threaded portion, and each second screw bushing has a second inner threaded portion and an external screwing section, wherein a diameter of the first inner threaded portion of each nut is equal to that of the external screwing section of each second screw bushing, and a diameter of the second inner threaded portion of each second screw bushing is equal to that of the second screwing section of each spoke, each second screw bushing has a noncircular notch defined on an end thereof opposite to the second inner threaded portion, and the noncircular notch is configured to rotate each second screw bushing, wherein the second inner threaded portion of each second screw bushing is extended out of the inner wall of the rim after passing through each through orifice, the second screwing section of each spoke is screwed with the second inner threaded portion of each second screw bushing, and the first inner threaded portion of each nut is screwed with the external screwing section of each second screw bushing;
   wherein each spoke further includes a peripheral rib extending adjacent to the first screwing section and configured to fix the each threaded orifice of the hub.

* * * * *